Oct. 25, 1938.    H. L. BREDOUW    2,134,025
SOUNDING APPARATUS
Filed May 2, 1936
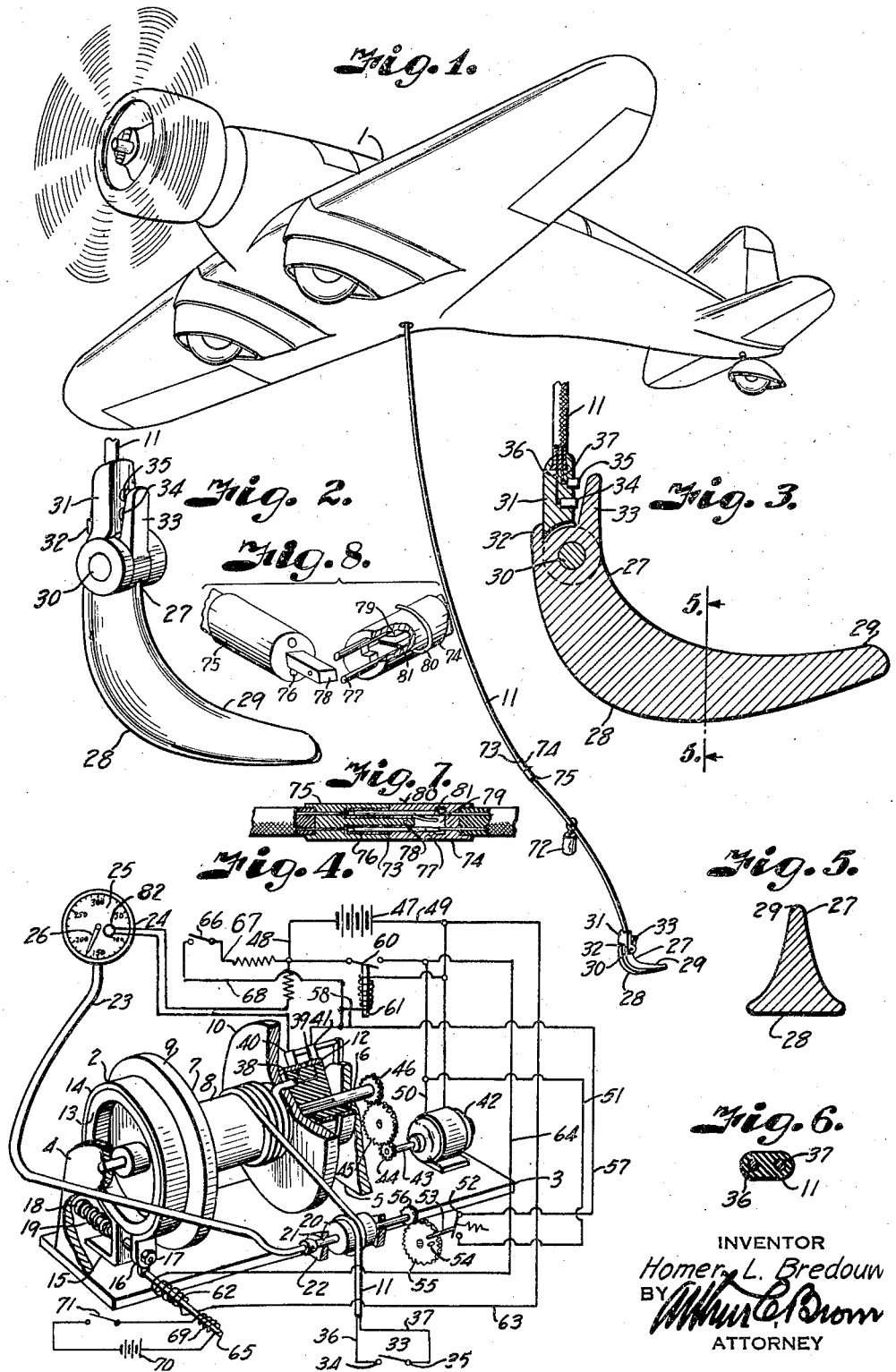
INVENTOR
Homer L. Bredouw
BY Arthur C. Brown
ATTORNEY Patented Oct. 25, 1938

2,134,025

UNITED STATES PATENT OFFICE 2,134,025

SOUNDING APPARATUS

Homer L. Bredouw, Kansas City, Mo.

Application May 2, 1936, Serial No. 77,649

9 Claims. (Cl. 33—126.6)

This invention relates to a sounding apparatus for determining actual altitude of aircraft above the ground or water when it is obscured from view of the pilot.

In present navigation practice, aircrafts are provided with instruments which indicate altitude relative to sea level, however, these types of instruments are of little use to a pilot in making a blind landing, as he is not concerned with his height above sea level but with his actual distance above the ground over which he is navigating. It is true that he knows the approximate elevation of that section above sea level and can approximately calculate the distance to the ground in that general locality, but this is not sufficient as the ground levels within a short distance may vary as much as several hundred feet, and while the aircraft may be at the calculated distance above sea level it may be within a few feet of crashing into the ground.

It is, therefore, the principal object of the present invention to provide an apparatus wherewith a pilot can readily ascertain the distance between his aircraft and the ground.

It is also an important object of the present invention to provide an apparatus whereby the pilot is kept informed progressively with his descent.

In accomplishing these and other objects of the invention, I have provided improved details of structure, the preferred form of which is illustrated in the accompanying drawing, wherein:

Fig. 1 is a perspective view of an airplane equipped with a ground contacting apparatus embodying the features of the present invention.

Fig. 2 is a detail perspective view of the ground contacting shoe.

Fig. 3 is a section through the contacting shoe, particularly illustrating the switch for closing the circuit to the height indicating apparatus carried in the airplane.

Fig. 4 is a detail perspective view of the reeling drum, height indicator and its operating motor showing the wiring connections therefor in diagram.

Fig. 5 is a section through the ground contacting shoe on the line 5—5 of Fig. 3 to illustrate the stream-lining thereof.

Fig. 6 is a cross-section through the lowering cable for the contacting shoe.

Fig. 7 is a detail elevational view partly in cross-section illustrating the prong and socket members of the cable in connected condition.

Fig. 8 is a detail perspective view of the prong and socket members of the cable in separated condition and particularly illustrating the frangible wire for normally maintaining the cable in connected condition.

Referring more in detail to the drawing:

1 designates an aircraft in which is mounted a reeling apparatus 2, including a supporting frame 3 having spaced bearing brackets 4 and 5 for rotatably mounting a shaft 6. Fixed to the shaft 6, intermediate the bearing brackets, is a reel 7 including a drum 8 having spaced end flanges 9 and 10. Wound on the drum, between the flanges 9 and 10, is a lowering cable 11 having one end extending through the end flange 10 and connected with a commutator 12 also keyed on the shaft 6 and rotatable with the reel.

Fixed to the other flange 9 of the reel is a brake drum 13 on which is mounted a brake band 14 having one end fixed to the frame by a bracket 15 and its opposite end terminating in an ear 16 to which is connected an actuating rod 17 that is slidably mounted in the bracket 15, and has a head 18 on its outer end. A coil spring 19 is sleeved over the rod and has one end bearing against the bracket 15 and its opposite end against the head 18 to normally retain the brake band in gripping contact with the drum 13 for preventing rotation of the reel. The other end of the cable is wrapped about a sheave 20 fixed on a counter-shaft 21 rotatably mounted in bearing brackets 22 on the supporting frame 3.

Coupled with one end of the counter-shaft is a flexible shaft 23 having its opposite end connected with a distance indicator 24 that is located in the airplane in convenient view of the pilot. The indicator includes a dial 25 having graduations preferably marked in feet, and movable over the dial under actuation of the flexible shaft is a pointer 26 that is normally at zero when the contact cable is wound on the reel, but which moves over the scale as the cable is unwound from the reel over the sheave to indicate the length of cable that is paid therefrom when ascertaining the distance of the airplane above the ground, as later described.

The free end of the contact cable extends through a suitable opening in the bottom of the aircraft and carries a ground contacting shoe 27 that is adapted to automatically set the reel in operation to wind up the paid out cable when the shoe makes contact with the ground. The shoe is preferably stream-lined and has a rounded contact face 28 and a feathered rear edge 29 to hold the rounded face in a straightaway position for contact with the ground. The shoe is pivotally mounted on a cross-pin 30 that is carried by a switch-block 31 fixed to the end of the cable.

The pivotal movement of the shoe relatively to the switch-block is maintained within a restricted limit by means of spaced stop lugs 32 and 33 which are adapted to engage the front and rear faces of the block. The lug 33 is of longer length than the lug 32 to constitute a switch-arm for closing circuit through spaced contacts 34 and 35 that are carried by the switch-block and attached to conductors 36 and 37 incorporated into the lowering cable.

The lowering cable is preferably formed of insulating material in which the electrical conductors 36 and 37 are imbedded to prevent shorting thereof and contact with metal parts over which the cable might be drawn. The conductors extend the full length of the cable and have their other ends connected to contact rings 38 and 39 of the commutator which are engaged by brushes 40 and 41 carried by the frame, as shown in Fig. 4.

42 designates a motor that is mounted on the frame 3 and has its armature shaft 43 provided with a pinion gear 44 meshing with a gear 45 having driving connection with a gear 46 on the shaft 6, so that when the motor is energized the shaft is rotated to rotate the reel to wind the cable thereon. The motor may be supplied with current from a suitable source, such as a battery 47, having one terminal connected with the brush 40 through a conductor 48 and its other terminal connected by a conductor 49 leading to one of the terminals of the motor. The other terminal of the motor is connected by a conductor 50 with the conductor 48.

Connected with the conductor 50 is a conductor 51 leading to a switch 52 having an arm 53 that is adapted to be engaged by a pin 54 on a suitably supported gear 55 that meshes with a pinion gear 56 on the counter-shaft. The other contact of the switch 52 is connected to the conductor 48 by a conductor 57 which also connects with the brush 41 by a branch 58. The gear 55 is driven by the counter-shaft pinion gear incidental to pay of the cable over the sheave 20 so that every time the gear 55 has made one revolution in an anti-clockwise direction the motor circuit is broken to stop operation of the reel. The gears 55 and 56 are of such size that a fixed number of feet of cable passes over the sheave during each period of motor operation, for example ten feet. The motor is so geared that the cable is wound in almost immediately upon closure of the circuit by the ground contacting shoe so that the shoe will not drag upon the ground.

As soon as the contacting shoe is raised from the ground the weight thereof will cause it to pivot on the pin 30 to break circuit through the contacts 34 and 35, however, I provide means for keeping the motor circuit closed until it is broken by the switch 52, upon contact of the pin 54 with the switch-arm 53. This is accomplished by connecting a solenoid switch 60 across the conductors 48 and 50 and in parallel with the switch on the contacting shoe. The solenoid 61 of the switch is energized immediately upon closure of the motor circuit through the conductors 36 and 37. This is accomplished by connecting the solenoid with the conductors 49 and 64, thus when the circuit, including conductors 36 and 37, is closed by the ground contacting shoe, current flows from the battery 47, through the conductor 48, brush 40, conductor 36, contacts 34 and 35, conductor 37, brush 41, and through the solenoid 61, back to the battery, through the conductor 49 to close the switch 60 so that current can then flow from the battery 47 through the conductor 48, switch 60, conductor 50, to the motor and back to the battery through the conductor 49.

Upon closing of the switch 60 there is established another path for the current from the battery through the solenoid, by way of the conductor 48, switch 60, conductors 50 and 51, switch 52, conductor 57 to the solenoid, and through the solenoid to the conductor 49 back to the battery, to retain the switch 60 in closed condition until the pin 54 strikes the arm 53 to open the switch 52. Upon opening of the circuit, including the switch 52, the circuit through the solenoid is broken to open the switch 60. Since the ground contact switch has previously opened and the switch 60 is now opened, the motor circuit is broken to stop wind-up of the reel and the reel will remain idle until the contacting shoe again makes engagement with the ground or other obstruction. Immediately upon subsequent engagement of the contact shoe, the circuit is again closed through the motor to continue operation thereof until the circuit is again broken by the switch 52. The reel is thus caused to reel in the cable a fixed amount upon each contact of the shoe with the ground.

In order to release the brake and allow rotation of the reel, as above described, whenever the motor is energized, the conductor 49 is connected with the winding of a brake solenoid 62 by a conductor 63. The other terminal of the solenoid is connected by a conductor 64 with the conductor 50, so that when either the switch carried by the contact shoe 27 or the switch 60 is closed current flows through the brake solenoid to energize the armature thereof for releasing the brake band against tension of the spring that holds it in gripping engagement with the drum, the armature 65 of the solenoid being connected to the ear 16, as clearly shown in Fig. 4.

In order to reel in the cable independently of the cable switch, I provide a manually operated switch 66 that is connected to the conductor 48 by a conductor 67 and with the conductor 58 by a conductor 68. When this switch is closed current flows through the solenoid coil 61 to hold the switch 60 closed and effect energization of the motor. As this switch is manually closed, current will be continuously supplied to the motor as long as it is held closed and the switch 52 is not effective in breaking the motor circuit.

In order to release the brake so as to allow paying out of the cable, the brake armature is provided with another solenoid winding 69 that is connected in circuit with a battery 70 whereby current is supplied to the coil upon closing of a switch 71. When this switch is closed, the secondary solenoid winding 69 is energized to release the brake and allow paying out of the cable.

It is desirable that the cable hang as near plumb as possible, and I, therefore, attach a weight 72 to the cable at a relatively short distance above the contact shoe 27. When the shoe makes contact with an object or the ground, the portion of the cable depending below the weight is free to flex or swing in an upward direction incidental to the impact with the point of weight attachment acting as a pivot. The shoe is, therefore, quicker to respond to the reaction of the impact and is thrown clear of any object tending to foul the cable.

To prevent damage to the aircraft in case the cable should foul, I form the cable into sections that are connected by a coupling device 73 comprising plug and socket members 74 and 75 that are respectively connected with the cable sections, the plug member being on the lower end of the upper section and the socket member on the upper end of the lower section. The socket 75 has sleeve contacts 76 for receiving prongs 77 on the plug member to make electrical connections between the contained conductors. The socket member also has a tongue 78 engaged in a recess 79 of the plug member the plug member being secured in the socket by means of a frangible wire 80 extending through aligned apertures in the tongue and socket members as shown in Figs. 7 and 8. It is thus obvious that should the lower section become entangled with some object, pull exerted by the aircraft on the cable will fracture the wire 80 and cause the connecting members to pull apart. When this separation occurs a spring contact 81 that is suitably mounted on one of the prongs for normal extension across to contact with the other prong and which is ordinarily retained from bridging across the prongs by the tongue 78 will be released to assume its normal position for shorting the conductor by bridging the prongs to complete a circuit therethrough and effect reeling in of the remaining part of the cable. It is desirable to warn the pilot when the sections part and for this reason I extend one of the cable conductors to the indicator and connect therein a signal light 82 which will burn continuously after the break occurs. This signal light will also flash upon each ground contact of the shoe 29 but as soon as the circuit through the shoe switch is broken the light will cease to burn. The pilot may thus be advised as to functioning of the ground contact shoe whenever it is in use.

In using a device constructed as described, and assuming that the pilot wishes to ascertain his distance above the ground, as when making a blind landing, he will close the switch 71 to effect energization of the secondary solenoid winding 69 for releasing the brake band from contact with the reel drum. Upon release of the brake the cable is automatically paid out under pull of the weight 72 plus the weight of the shoe. Paying out of the cable rotates the counter-shaft and results in moving the pointer over the dial to indicate the amount of cable paid out. When the cable has been completely paid out and no contact has been made with the ground, the pilot knows that he is at an altitude greater than the length of the cable, or in the illustrated instance, more than three hundred feet above the ground. He will then lower his craft until the contact shoe engages the ground. At this time he will be three hundred feet above the ground.

Immediately upon engagement of the contact shoe with the ground or other extraneous objects, the circuit is closed thereby through the conductors to effect operation of the motor. Upon energization of the motor the reel will be rotated, winding up the cable until the pin 54 engages the switch-arm to break circuit through the solenoid coil 61, whereupon the switch 60 is opened to break the motor circuit and stop rewinding of the reel. Upon breaking of the circuit the spring 19 comes into play to apply the brake band for holding the reel. The pilot will then lower his craft until another ground contact is made, whereupon the circuit is again closed to wind in the reel another fixed amount as controlled by the timing of the pin 54.

The aircraft will thus be lowered in progressive stages as gauged by the cable, until the ground is in sight or until the pilot knows that he is within a safe distance of the ground to land. By observing the indicator hand 26, the pilot can readily observe his height above the ground upon each contact of the shoe therewith. He is thus kept warned of his elevation relatively to the ground from the time that the first contact has been made, and can lower his craft accordingly.

From the foregoing, it is obvious that I have provided an apparatus whereby a pilot can readily ascertain his elevation above the ground when it is necessary for him to make a blind landing, and which will aid him in making a safe descent.

What I claim and desire to secure by Letters Patent is:

1. In a sounding apparatus, a reel, supporting means rotatably mounting the reel in a given position, a sectional cable having one end engaged with the reel, a contact device carried by the other end of the cable, a motor for actuating the heel to wind the cable thereon, a source of current supply for the motor, conductors incorporated in the cable and adapted to complete a circuit through the contact device, motor and source of current supply incidental to engagement of the contact device with the ground, means mounted in the connecting ends of the cable sections adapted to allow disconnection of the lower section of the cable upon entanglement thereof with an object on the ground, and signal means actuated through said conductors incidental to disconnection of the cable sections.

2. In a sounding apparatus, a reel, supporting means rotatably mounting the reel in a given position, a sectional cable having one end engaged with the reel, a contact device carried by the other end of the cable, a motor for actuating the reel to wind the cable thereon, a source of current supply for the motor, conductors incorporated in the cable and adapted to complete a circuit through the contact device, motor and source of current supply incidental to engagement of the contact device with the ground, and means mounted in the connecting ends of the cable sections adapted to allow disconnection of the lower section of the cable upon entanglement thereof with an object on the ground.

3. In a sounding apparatus, a reel, supporting means rotatably mounting the reel in a given position, a sectional cable having one end engaged with the reel, a contact device carried by the other end of the cable, a motor for actuating the reel to wind the cable thereon, a source of current supply for the motor, conductors incorporated in the cable and adapted to complete a circuit through the contact device, motor and source of current supply incidental to engagement of the contact device with the ground, means mounted in the connecting ends of the cable sections adapted to allow disconnection of the lower section of the cable upon entanglement thereof with an object on the ground, signal means, and means on the upper cable section adapted to short the conductors upon disconnection of the lower cable section therefrom for actuating the signal means.

4. In a sounding apparatus, a support, a contact device, means for lowering the contact device relative to the support, means for raising the contact device from its lowered position, means indicating the distance of the contact device from the support, safety means in the lowering means adapted to allow disconnection of the lower portion thereof upon entanglement of the contact device with an object below the support, and means in said safety means operable incidental to disconnection of said portion of the lowering means for actuating said raising means.

5. In a sounding apparatus, a reel, supporting means rotatably mounting the reel in a given position, a cable having one end engaged with the reel and having a switch block on its other end provided with contacts, a contact device pivotally mounted on the switch block, said device having a lateral extension normally maintaining the same out of engagement with said switch block contacts, a motor for actuating the reel to wind the cable thereon, a source of current supply for the motor, and conductors incorporated in the cable connected with the switch block contacts and completing a circuit through the contact device, motor and said source of current supply incidental to pivotal movement of said extension into engagement with said contacts in response to engagement of the contact device with the ground.

6. In a sounding apparatus, a reel, supporting means rotatably mounting the reel in a given position, a cable engaged with the reel, a shaft rotatably supported on the reel supporting means and engaged with the cable, means connected with the shaft and movable in response to rotation of the shaft, a contact device carried by the cable, a motor for actuating the reel to wind the cable thereon, a source of current supply for the motor, a switch connected with the motor and adapted to be engaged by said movable means upon a predetermined number of revolutions of said shaft for deenergizing the motor, and conductors incorporated in the cable adapted for connecting the contact device in circuit with the motor and said current supply to actuate the reel incidental to engagement of the contact device with the ground.

7. In a sounding apparatus, a reel, supporting means rotatably mounting the reel in a given position, a cable engaged with the reel, a shaft rotatably supported on the reel supporting means and engaged with the cable, means connected with the shaft and movable in response to rotation of the shaft, a contact device carried by the cable, a motor for actuating the reel to wind the cable thereon, a source of current supply for the motor, a switch connected with the motor and adapted to be engaged by said movable means upon a predetermined number of revolutions of said shaft for deenergizing the motor, and an indicator driven from said shaft to register the length of cable paid out.

8. In a sounding apparatus, a support, a contact device, means on the support for raising and lowering the contact device relative to the support, and means on the support engaged with and actuated by said raising and lowering means adapted to control raising of the contact device and limit the upward movement of same to a plurality of predetermined stages.

9. In a sounding apparatus, a support, a contact device, means on the support for raising and lowering the contact device relative to the support, means on the support engaged with and actuated by said raising and lowering means adapted to control raising of the contact device and limit the upward movement of same to a plurality of predetermined stages, and means forming part of the raising and lowering means allowing disengagement of the contact device therefrom in response to restraint on the device greater than normal impact with the ground.

HOMER L. BREDOUW.